Apr. 17, 1923.　　　　　　　　　　　　　　1,451,855
E. WRIGHT
WEDGE
Filed Dec. 19, 1921

Inventor
Edward Wright
By Shepherd Campbell
Attorneys

Patented Apr. 17, 1923.

1,451,855

UNITED STATES PATENT OFFICE.

EDWARD WRIGHT, OF HAMILTON, ONTARIO, CANADA, ASSIGNOR OF ONE-HALF TO ALEXANDER MacMILLAN, OF HAMILTON, ONTARIO, CANADA.

WEDGE.

Application filed December 19, 1921. Serial No. 523,592.

*To all whom it may concern:*

Be it known that I, EDWARD WRIGHT, citizen of Canada, residing at 384 Herkimer Street, Hamilton, in the Province of Ontario and Dominion of Canada, have invented certain new and useful Improvements in Wedges, of which the following is a specification, reference being had therein to the accompanying drawings.

The object of the present invention is to provide an improved wedge useful in splitting wood, quarrying stone, shoring and wrecking buildings and in fact of utility in any relation where a wedge may be employed. While the wedge constituting the subject matter of the present application is of general utility, it is particularly useful in the lumbering industry.

It is an object of the invention to provide a wedge of the character indicated of such a shape as to cause it to exert a twisting and rending action upon the substance being split, when the wedge is used for such purpose. It is likewise an object of the invention to provide a wedge of such character that the resultant opening formed by the wedge will be of materially greater width than with a wedge of equal thickness when made in the old way.

It is a further object of the invention to provide a wedge of the character indicated having its faces so shaped as to reduce friction between the wedge and the material being acted upon, so that the wedge may be withdrawn with a minimum of effort.

Further objects and advantages of the invention will be set forth in the detailed description which follows.

In the drawing.

Like numerals designate corresponding parts throughout the several figures of the drawing.

Figure 1:
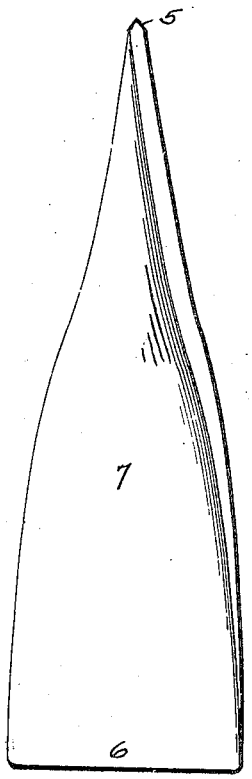
Fig. 1 is a front elevation of a wedge constructed in accordance with the invention.
Figure 2:
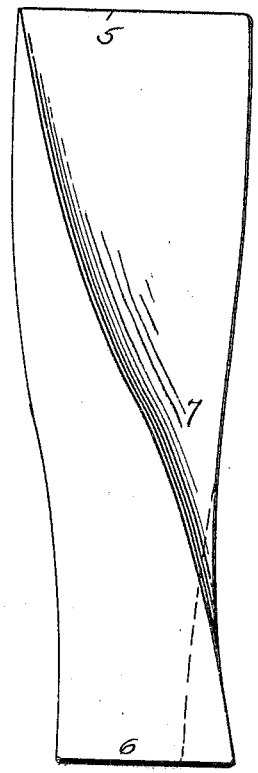
Fig. 2 is a side elevation thereof.
Figure 3:
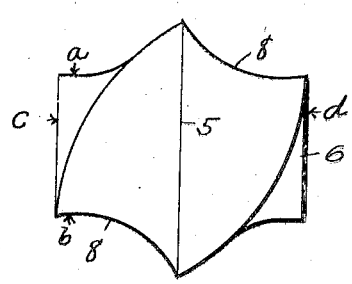
Fig. 3 is an end view looking from the cutting edge of the wedge toward the head thereof.

The wedge consists of a body portion which is given a right angular twist in its length merging from a cutting edge 5 into a rectangular head 6, the cutting edge lying at right angles to said head and the intervening body portion 7 being of spiral formation. By referring to Figure 3, it will be observed that the faces of this body portion are shaped to render them concave, as indicated at 8.

The structure described possesses several distinct advantages as follows:

First: As the wedge is driven into an object to be split its spiral formation causes it to exert a distinct twisting and rending action which greatly increases its efficiency for the purposes indicated;

Second: Where, with a wedge of ordinary construction, the maximum separation of the parts being split would be equal to the thickness or height of the head 6 or in other words equal to the distance between points *a—b* in Fig. 3, such separation with the present wedge is increased to the distance between the points *c* and *e*, Fig. 3; and Third: The "relieving" of the faces of the wedge by making them of concave formation coupled with the increased width of opening in the article being split relieves the friction upon the wedge to such an extent as to render it possible to withdraw the same for a fresh insertion thereof, with a minimum of labor.

The wedge may be made of metal, fiber, wood or any other suitable material. Its size varies with the nature of the work to be done.

While in the present instance the cutting edge is shown lying substantially at right angles to the head, it is not essential that this edge be exactly at right angles to the head, for advantageous results may be had over the old type of wedges with the cutting edge lying at angles other than right angles to the head.

Having described my invention what I claim is:

A wedge of the character described having at one end a rectangular and elongated head and at its other end a cutting edge which lies substantially at right angles to the said head and a connecting body portion of spiral formation, having its side faces concaved.

In testimony whereof I hereunto affix my signature.

EDWARD WRIGHT.